Patented Apr. 23, 1946

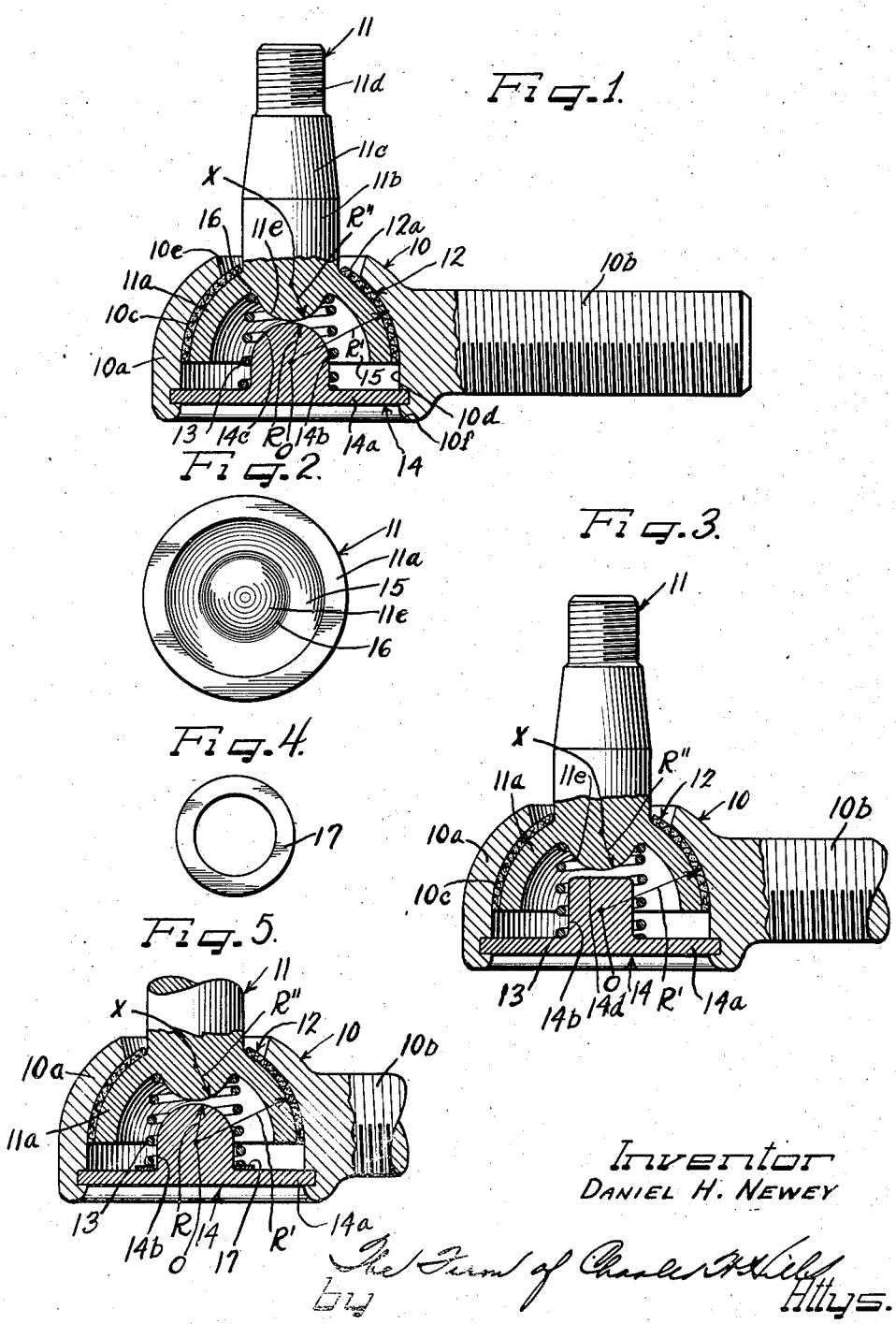

2,398,848

UNITED STATES PATENT OFFICE 2,398,848

SOCKET ASSEMBLY

Daniel H. Newey, Detroit, Mich., assignor to Thompson Products, Inc., Cleveland, Ohio, a corporation of Ohio Application December 2, 1944, Serial No. 566,377

8 Claims. (Cl. 287—90)

This invention relates to stud and socket assemblies having automatic wear take-up properties and composed of a minimum number of inexpensive parts.

Specifically, the invention deals with tie rod joints wherein the conventional spring seat or spring retainer has been eliminated.

According to this invention, joint sockets or housings are provided with closure plug means having lugs thereon for centering a coil spring. Studs are mounted for limited universal movement in the sockets or housings, and have recessed head portions with central protuberances therein receiving the opposite ends of the coil springs. The protuberances preferably have close operating clearance relationship with the lugs on the closure plugs so that the joint parts will remain in operative assembly even when the coil spring is broken. The lugs on the closure plugs and the protuberances in the hollow heads of the studs cooperate to maintain the springs in proper position for urging the stud heads into good bearing relationship with the socket bearing walls thereby compensating for wear and preventing looseness of the parts.

A feature of the invention resides in the elimination of the heretofore-necessary spring retainer or spring seat interposed between the spring and stud of tie rod joints for tiltably and rotatably receiving a part of the stud.

Another feature of the invention resides in the provision of a joint stud with a hollow half-ball head containing a central protuberance to center a spring in the head.

An object of this invention is to provide socket assemblies having wear take-up properties and avoiding the heretofore-necessary use of spring retainers or spring seats.

A further object of the invention is to provide tie rod joints with a minimum number of operating parts.

A still further object of the invention is to provide tie rod joints wherein a closure plug has a protuberance thereon cooperating with a protuberance on the stud of the joint to maintain the joint spring in operating position without the necessity for heretofore-used spring seats.

A still further object of the invention is to provide a stud and socket assembly wherein the stud has close operating clearance relationship with a fixed part of the socket to maintain the stud in operative relation with the socket even though the wear take-up spring of the assembly is destroyed.

A specific object of the invention is to provide a rotatable washer on the closure plug of a socket assembly for bottoming a spring.

Other and further objects of the invention will be apparent to those skilled in the art from the following detailed description of the annexed sheet of drawings which, by way of preferred examples, illustrates several embodiments of the invention.

On the drawing:

Figure 1 is a side elevational view, with parts broken away and shown in vertical cross section, of one form of tie rod joint according to this invention.

Figure 2 is a bottom plan view of the stud of the joint shown in Figure 1.

Figure 3 is a fragmentary side elevational view, with parts broken away and shown in vertical cross section, of a slightly modified form of tie rod joint according to this invention.

Figure 4 is a plan view of a metal washer used in a modified joint according to this invention.

Figure 5 is a view similar to Figure 3, but illustrating a modified form of the invention embodying the washer of Figure 4.

As shown on the drawing:

The joint of Figure 1 includes a socket or housing 10, a stud 11, a stud seat 12, a wear take-up spring 13, and a closure plug 14. The housing 10 has an enlarged end portion 10a and a laterally projecting externally threaded stem 10b. The end portion 10a provides the housing or socket for the stud 11 while the stem portion 10b mounts this housing on a tie rod or the like (not shown). The housing portion 10a contains a fragmental spherical internal bearing wall 10c converging from a cylindrical bore 10d at one end of the housing to a reduced-diameter opening 10e at the other end of the housing. The socket is conveniently formed by forging and machining operations. The bore 10d is counterbored to receive the closure plug 14 against a shoulder at the bottom of the counterbore and the end of the housing is then spun over the peripheral margin of the closure plug 14 as at 10f to retain the plug in position in the housing.

The stud 11 has a hollow half-ball head 11a in the socket 10a receiving the seat 12 therearound. A cylindrical shank portion 11b projects from the head 11a through the opening 10e of the socket and snugly projects through the openings in the seat 12. This cylindrical portion 11b causes the seat 12 to move with the stud during all tilting movements thereof and the seat 12 has an external bearing wall 12a in bearing engagement with the bearing wall 10c of the socket. The stud head 11a can rotate about its own axis inside of the seat 12.

The cylindrical portion 11b of the stud shank extends to the large bottom end of a tapered shank portion 11c adapted to receive the eye end of a steering arm or the like therearound. A reduced-diameter externally threaded cylindrical portion 11d extends from the small end of the tapered portion 11c and is adapted to receive a locking nut (not shown) thereon.

The seat member 12 is illustrated as being composed of molded plastic-impregnated fiber such as canvas, but it should be understood that the seat can be composed of metal or any other bearing material.

The hollow stud head has a rounded central protuberance 11e therein aligned with the cylindrical shank portion 11b and projecting into the recess 15 provided by the hollow head. The recess 15 converges from a major diameter portion at the open end of the head to a reduced-diameter annular groove portion 16 around the protuberance 11e. The coil spring 13 has an end coil thereof bottomed in this annular groove 16 so that it is confined by the protuberance 11e and by the side wall of the recess 15.

The closure plug 14 has a plate-like portion 14a closing the open bore 10d of the socket 10a as explained above. A central lug or protuberance 14b projects from the plate 14a into the recess 15 of the head 11a and receives several coils of the spring 13 therearound. The spring 13 is bottomed on the plate portion 14a of the plug.

The lug 14b has a fragmental spherical top end portion 14c struck from the center O by a radius R. This center O is also the center of tilting of the stud head and seat and a longer radius R' from the center O generates the tilting bearing wall 10c of the socket 10a and the bearing wall of the stud head 11a. The stud and lug surfaces 14c are thus concentrically mounted in the housing. The protuberance 11e of the stud has a fragmental spherical configuration struck from a center X by a radius R''.

Since the radii R and R' are struck from the same center O, the protuberance 11e will not bind against the surface 14c during tilting movements of the stud and, as a result, a very small operating clearance can be maintained between the lug surface 14c and the surface of the protuberance 11e. This small operating clearance will insure maintained operation of the joint even though the spring 13 becomes broken.

In the embodiment of Figure 1, the rounded surface of the lug 14c need only be spaced from 1/64 to 1/32 of an inch from the protuberance 11e, since both the lug and the protuberance have rounded or fragmental spherical end surfaces.

In the embodiment of the invention shown in Fig. 3, parts identical with parts described in connection with Figure 1 have been marked with the same reference numerals.

In Figure 3, the lug 14b on the closure member 14 has a flat top surface 14d while the protuberance 11e has a fragmental spherical surface struck from a radius R'' centered at X. The stud 11 tilts about the center O the same as the joint of Figure 1 and therefore, in order to maintain clearance between the flat face 14d and the protuberance 11e, it is necessary to space the surface 14d further away from the protuberance in the illustrated straight vertical position of the stud. The embodiment of Figure 3 is thus identical with the embodiment of Figure 1, except that the lug is provided with a flat top or wall spaced a greater distance from the rounded protuberance 11e than the rounded top wall 14c of the embodiment of Figure 1.

In the embodiment of Figure 5, parts identical with parts described in connection with Figure 1 have been marked with the same reference numerals. In this embodiment, however, the spring 13 is bottomed on a washer 17 embracing the lug 14b of the closure disk 14 and resting on the plate part 14a of the closure plug. This washer is adapted to rotate with the spring so that the spring can turn with the stud to carry the washer therewith and eliminate binding of the washer on the plug. As a result, resistance to turning movement is decreased.

From the above descriptions it should be understood that the invention now provides socket assemblies or joints of the stud and socket type equipped with wear take-up springs directly interposed between the stud and socket without the necessity for intermediate spring retaining means. It should also be understood that the invention provides a novel stud construction for tie rod joints wherein a hollow half-ball head on the stud has a central protuberance projecting into the recess of the stud head to cooperate therewith for forming a spring-locating groove. The invention also includes a lug on the closure plate of the socket assembly for close operating clearance relationship with the protuberance on the stud, and for centering the wear take-up spring. In one form of the invention, the lug on the closure plate has very close operating clearance relationship with the protuberance on the stud, and has a rounded configuration permitting tilting of the stud without causing contact between the stud protuberance and the lug on the closure plate. In another form of the invention, the clearance relationship between the stud protuberance and the lug on the closure plate is increased, so that the lug can have a flat surface and the plug need not be assembled concentric with the stud.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A socket assembly comprising means defining a socket accommodating tilting and rotating movements, a closure plug for said socket having a spring-locating lug projecting into the socket, a stud having a recessed head in said socket, a rounded protuberance on said stud projecting into the recess of the head, said lug and said protuberance on said stud being in closely spaced relationship, and a wear take-up spring bottomed on the closure plug around the lug portion thereof and seated in the recess of the stud head around the protuberance thereof.

2. A tie rod joint comprising a housing having a bearing wall accommodating tilting movements, a closure plug for said housing having a central lug portion projecting into the housing, a stud having a hollow head in said housing in tiltable relation to said bearing wall thereof, said lug on said closure plug projecting into the hollow head of the stud, and a coil spring bottomed on the closure plug surrounding said lug portion and projecting into the hollow head of the stud to act against the stud for maintaining the stud head in proper bearing relationship with the bearing wall of the housing.

3. A tie rod joint comprising a housing member having an enlarged end portion defining a socket and a laterally projecting stem portion adapted for connection to a tie rod, said socket having a converging bearing wall accommodating tilting movements and a reduced opening at the converging end of said bearing wall, a closure plug for the other end of said socket, said closure plug having a central lug projecting into the socket, a stud having a shank portion projecting freely through said reduced opening of the socket and a head portion seated in said socket in tiltable and rotatable bearing relation to the socket wall, said head portion having a recess therein receiving said lug of the closure plug, and a spring surrounding said lug bottomed on said closure plug acting against said stud in the recess of said head to maintain the stud in proper bearing relation with the socket.

4. A joint comprising a socket having opposed open ends and an intermediate bearing wall accommodating tilting movements, a closure plug closing one open end of the socket and having a lug portion projecting into the socket, a stud having a shank portion projecting freely through the other end of the socket and a head portion seated in said socket, said head portion having a recess receiving said lug of the closure plug together with a rounded protuberance projecting into the recess in opposed relationship to the lug on the plug, and a coil spring surrounding said lug in the plug and said rounded protuberance and bottomed at opposite ends on the stud and closure plug for maintaining the stud in good bearing relationship with the socket.

5. A tie rod joint comprising a housing having a bearing wall accommodating tilting and rotating movements of the stud, a closure plug for said housing composed of a plate portion spun into the housing in fixed relationship therewith and a central lug portion projecting into the housing, said central lug portion having a rounded end surface, a stud having a hollow fragmental spherical head disposed in said housing in tiltable and rotatable relationship relative to the housing, said hollow ball head of the stud having a rounded protuberance projecting into closely spaced relationship with the rounded surface of the lug, said rounded surface of the lug and said rounded protuberance accommodating free tilting and rotating movements of the stud relative to the housing without binding, and a coil spring bottomed on the plate portion of the closure plug and surrounding the lug and protuberance to act on the stud for maintaining the stud head in good bearing relationship with the wall of the housing.

6. In a tie rod joint including a socket and a stud tiltable and rotatable relative to the socket, the improvement which comprises a hollow head on said stud in said socket providing a recess, a closure plug for said socket having a lug projecting into said recess, said lug having a fragmental spherical end surface struck from the same center as the tilting center of the stud in said socket, said stud having a rounded protuberance in the hollow head portion thereof opposing said rounded end of the lug in closely spaced relation, and a coil spring bottomed on the closure plug surrounding the lug and protuberance and acting on the stud to maintain the stud head in good bearing relation with the socket.

7. In a tie rod joint including a socket having a closure plug and a stud mounted for universal movement in said socket, the improvements of a lug on said closure plug having a flat end wall and a rounded protuberance on said stud opposing said flat end wall, said flat end wall and said rounded protuberance having sufficient clearance therebetween to permit free tilting of the stud, and a coil spring embracing the lug and protuberance bottomed on the closure plug and on the stud for maintaining the stud in good bearing relation with the socket.

8. In a tie rod joint including a socket and a stud mounted for limited universal movement in the socket, the improvements of a closure plug for said socket having a central lug projecting into the socket, a stud having a protuberance thereon opposing said lug, a coil spring embracing the lug and protuberance, and a rotatable washer interposed between the coil spring and the closure plug whereby said spring can rotate freely on the plug while maintaining the stud in good bearing relation with the socket.

DANIEL H. NEWEY.